UNITED STATES PATENT OFFICE.

ALMIRA J. PRIEST, OF IMOGENE, IOWA.

YEAST AND PROCESS OF MAKING SAME.

SPECIFICATION forming part of Letters Patent No. 646,761, dated April 3, 1900.

Application filed December 29, 1899. Serial No. 741,961. (No specimens.)

*To all whom it may concern:*

Be it known that I, ALMIRA J. PRIEST, a citizen of the United States, residing at Imogene, in the county of Fremont and State of Iowa, have invented certain new and useful Improvements in Yeast and Processes of Making the Same, of which the following is a specification.

My invention relates to an improved yeast and to a process of making the same.

The process by which I make my yeast and the ingredients and proportions of the same are substantially as follows: Take one pint of fresh buttermilk; put in a pan and boil; when boiling stir in one-half pint of white cornmeal; let boil well; then remove from fire and let cool; when milk-warm stir into this one cup of good yeast; set in a warm place to rise; when light stir into this three pints of white cornmeal and one-fourth pound of potato-starch; mix and spread out to dry.

Of course it will be understood that I may modify the proportions and process without departing from the spirit of my invention.

Having now fully described my invention, what I claim as new, and desire to secure by Letters Patent, is—

1. A compound for yeast, consisting of the following ingredients: fresh buttermilk; white cornmeal; yeast; and potato-starch; substantially as described.

2. The process of making yeast, consisting in first boiling fresh buttermilk; then stirring in white cornmeal; then cooling; then stirring in yeast; placing in a warm place to rise; and then stirring in white cornmeal and potato-starch.

In testimony whereof I affix my signature in presence of two witnesses.

ALMIRA J. PRIEST.

Witnesses:
 JAMES LAUGHLIN,
 W. H. MCGARGILL.